(12) United States Patent
Walton et al.

(10) Patent No.: US 11,754,524 B2
(45) Date of Patent: Sep. 12, 2023

(54) APPARATUSES, SYSTEMS AND METHODS FOR SEQUENCING USING CAPILLARY ELECTROPHORESIS

(71) Applicant: LIFE TECHNOLOGIES CORPORATION, Carlsbad, CA (US)

(72) Inventors: Ian Walton, Redwood City, CA (US); Robert Cobene, Santa Clara, CA (US); Alexander Dukhovny, San Francisco, CA (US); Adam Sannicandro, San Francisco, CA (US); John Dixon, Moss Beach, CA (US); Achim Karger, Foster City, CA (US); Dan Kline, Encinitas, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 552 days.

(21) Appl. No.: 16/922,754

(22) Filed: Jul. 7, 2020

(65) Prior Publication Data
US 2020/0333291 A1    Oct. 22, 2020

Related U.S. Application Data

(62) Division of application No. 15/124,129, filed as application No. PCT/US2015/019310 on Mar. 6, 2015, now Pat. No. 10,746,695.

(Continued)

(51) Int. Cl.
*G01N 27/453* (2006.01)
*G01N 27/447* (2006.01)
*G01N 35/10* (2006.01)

(52) U.S. Cl.
CPC . *G01N 27/44791* (2013.01); *G01N 27/44708* (2013.01); *G01N 27/44721* (2013.01);
(Continued)

(58) Field of Classification Search
CPC ....... G01N 27/44791; G01N 27/44708; G01N 27/44721; G01N 27/44743; G01N 35/1016
See application file for complete search history.

(56) References Cited

U.S. PATENT DOCUMENTS

| 5,900,132 A * | 5/1999 | Keenan ............ G01N 27/44721 |
| | | 204/603 |
| 6,387,234 B1 | 5/2002 | Yeung et al. |
| | (Continued) | |

FOREIGN PATENT DOCUMENTS

| CN | 102203605 A | 9/2011 | |
| EP | 0329341 A2 * | 8/1988 | ............. G01N 27/26 |
| | (Continued) | | |

OTHER PUBLICATIONS

EPO computer-generated English language translation of Hayashizaki et al. JP 10206384 A, patent published Aug. 7, 1998 (Year: 1998).*

(Continued)

*Primary Examiner* — Alexander S Noguerola
(74) *Attorney, Agent, or Firm* — François A. Pelaez

(57) ABSTRACT

In one aspect, a biological sequencing device comprising a cartridge configured to be removed from the instrument is disclosed. In various embodiments the cartridge can include one or more capillaries suitable for capillary electrophoresis, a reservoir and a pump. In various embodiments the reservoir can contain a separation matrix. In various embodiments the pump can load a capillary with separation matrix. In another aspect the biological sequencing device can include one or more capillaries and an integrated valve assembly. In various embodiments the integrated valve assembly can provide a polymer to the one or more capillaries.

7 Claims, 8 Drawing Sheets

Related U.S. Application Data

(60) Provisional application No. 61/949,978, filed on Mar. 7, 2014.

(52) U.S. Cl.
CPC . *G01N 27/44743* (2013.01); *G01N 27/44756* (2013.01); *G01N 35/1016* (2013.01); *G01N 35/10* (2013.01)

(56) References Cited

U.S. PATENT DOCUMENTS

| | | | |
|---|---|---|---|
| 8,500,980 | B1 | 8/2013 | Amirkhanian et al. |
| 2003/0165941 | A1* | 9/2003 | Gjerde ............... C12Q 1/6869 435/6.12 |
| 2004/0063217 | A1 | 4/2004 | Webster et al. |
| 2004/0226822 | A1 | 11/2004 | Guzman |
| 2006/0096863 | A1* | 5/2006 | Yamazaki ........ G01N 27/44708 204/601 |
| 2010/0291619 | A1 | 11/2010 | Robinson et al. |
| 2013/0085680 | A1 | 4/2013 | Arlen et al. |
| 2013/0115607 | A1 | 5/2013 | Nielsen et al. |
| 2015/0024436 | A1 | 1/2015 | Eberhart et al. |

FOREIGN PATENT DOCUMENTS

| | | | | |
|---|---|---|---|---|
| EP | 0607495 | A1 * | 7/1994 | ........... G01N 27/447 |
| JP | 10206384 | A * | 8/1998 | ........... G01N 27/447 |
| JP | 2004532384 | A | 10/2004 | |
| WO | WO-02059589 | A2 | 8/2002 | |
| WO | WO-2010025302 | A2 | 3/2010 | |
| WO | WO-2013059750 | A1 | 4/2013 | |

OTHER PUBLICATIONS

International Application No. PCT/US2015/019310, International Search Report and Written Opinion dated Jun. 10, 2015, 10 Pages.

\* cited by examiner

APPARATUSES, SYSTEMS AND METHODS FOR SEQUENCING USING CAPILLARY ELECTROPHORESIS

CROSS-REFERENCE TO RELATED APPLICATIONS

This application is a divisional of U.S. application Ser. No. 15/124,129 filed Sep. 7, 2016, which is a 371 of PCT/US2015/019310 filed Mar. 6, 2015, and which claims the benefit of priority to U.S. Provisional Application No. 61/949,978 filed Mar. 7, 2014, which disclosures are herein incorporated by reference in their entirety.

FIELD

The present disclosure generally relates to apparatuses, systems and methods for simplifying the user experience during sequencing of biological samples using capillary electrophoresis.

BACKGROUND

The present disclosure relates to a multi-capillary electrophoresis apparatus and components thereof. The present disclosure further relates to structures and mechanisms designed to house multiple components of a multi-capillary electrophoresis apparatus.

Capillary electrophoresis devices generally provide certain major components that include, for example, a capillary array, a separation medium source for providing medium to the capillaries, a sample injection mechanism, an optical detector component, an electrode, and anode buffer source on one end of the capillaries, and a cathode buffer source on the other end of the capillaries. Capillary electrophoresis devices generally also provide various heating components and zones to regulate the temperature of many of the aforementioned components. Regulating the temperature of many of these components can improve quality of results.

To provide the major components of a capillary electrophoresis device while regulating the temperature of many of these components, current capillary electrophoresis devices use multiple structures to house these components and connect or couple these structures together to provide a working capillary electrophoresis device. Using multiple structures has disadvantages. For example, each of the interconnected structures may require its own temperature regulating mechanisms, thus creating independent temperature control zones. Each of these zones would then require associated individual control mechanisms. This multi-structure design increases the overall number of components in the apparatus, complicates the temperature control scheme, and increases the chances of component failure due to the sheer number of components involved. FIG. 1 shows one such design, illustrating multiple temperature control zones TCM0 to TCM5.

The use of multiple interconnected structures is also not user-friendly. For example, attaching the polymer source to the capillary array can be complicated and runs the risk of introducing bubbles or other artifacts each time the array is detached and attached to the polymer source. Moreover, the user, rather than the manufacturer, generally must attach the buffer source to the array, and must do it multiple times through the life of the capillary array.

It is therefore desirable to provide a capillary electrophoresis apparatus with a reduced number of interconnected structures to reduce the number of necessary heating zones, reduce user handling of the structures, reduce likelihood of component failure, and reduce introduction of bubbles and other artifacts into the apparatus.

SUMMARY

Apparatuses and methods for simplifying the user experience during sequencing of biological samples using capillary electrophoresis are disclosed.

FIG. 2 provides a basic schematic representation of a portion of a conventional capillary electrophoresis apparatus. In particular, FIG. 2 illustrates the capillary array, the electrode components (anode and cathode), the polymer source, buffer source, and polymer introduction mechanism (illustrated as a syringe pump). As illustrated, a coupling is provided to connect the capillary array assembly to the Polymer/Buffer structure, which includes the polymer source, buffer source, anode, and syringe pump. As provided, a temperature-controlled zone controls only the enclosed capillary array assembly and cathode. As such, additional temperature control is needed for the polymer source and delivery path. Moreover, a user must couple the capillary array assembly to the Polymer/Buffer structure.

In one aspect, a biological sequencing device can comprise a sequencing instrument and a cartridge configured to be removed from the instrument as shown in FIG. 3. The cartridge can include one or more capillaries suitable for capillary electrophoresis, a reservoir containing a polymer and a pump for introducing the polymer into the capillary. It is known in the art that sequencing instruments can include one vessel containing a polymer and a second vessel containing a buffer. The polymer contained in the reservoir of the cartridge can also serve as a buffer thereby reducing the number of vessels in the instrument. Configuring the cartridge as a removable element can further enable a user to rapidly replace the capillaries and the polymer to expedite the evaluation of another sequencing analysis.

Providing the capillary array, cathode, polymer/buffer source, and polymer introduction mechanism into a single cartridge has many advantages. For example, such a single cartridge allows for combining the buffer with the polymer as the anode buffer and providing this polymer/buffer package in a small volume to fit into the cartridge and therefore make it a low use item. The polymer/buffer reservoir can advantageously be attached to the array at time of cartridge manufacture so the customer only has to install the entire cartridge into the capillary electrophoresis apparatus. Alternatively, the cartridge can be designed such that the customer only has to attach the polymer/buffer reservoir to the array once before closing and installing the cartridge such that the two are combined for the life of the array and the polymer.

In another aspect an integrated valve assembly can be used. The integrated valve assembly can include an interface to couple the integrated valve to the capillary cartridge, an on-board manifold, containment for a polymer, a printed electrode and two linear actuators. In various embodiments the integrated valve assembly can be disposable. In other embodiments the integrated valve assembly can be sufficient to run multiple sequencing experiments.

BRIEF DESCRIPTION OF THE DRAWINGS

For a more complete understanding of the principles disclosed herein, and the advantages thereof, reference is now made to the following descriptions taken in conjunction with the accompanying drawings, in which.

DESCRIPTION OF VARIOUS EMBODIMENTS

Figure 1:
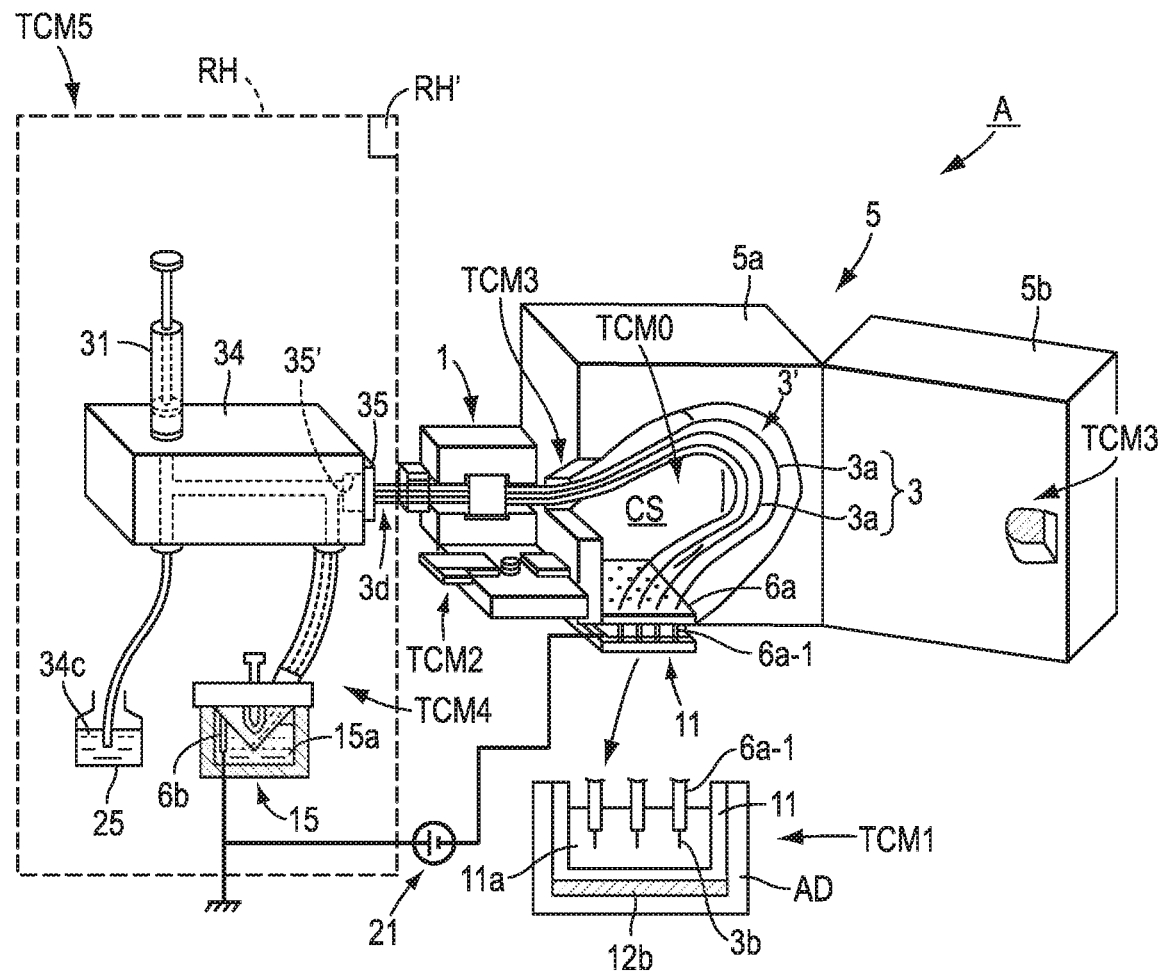
FIG. 1 is a block diagram that illustrates a current capillary electrophoresis device.

Embodiments of apparatuses, systems and methods for providing a simplified workflow for nucleic acid sequencing are described in this specification. The section headings used herein are for organizational purposes only and are not to be construed as limiting the described subject matter in any way.

Reference will be made in detail to the various aspects of the disclosure, examples of which are illustrated in the accompanying drawings. Wherever possible, the same reference numbers will be used throughout the drawings to refer to the same or like parts.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

It will be appreciated that the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

Generally, in the case of providing instruments to biological laboratories for biological sequencing, an uncomplicated workflow can be beneficial for at least the following reasons. First, laboratories are frequently concerned with conducting experiments economically which can include utilizing lesser trained individuals interfacing with the instruments. Second, the less time a user needs to interact with the instrument can increase the number of experiments that can be run in a day.

Figure 2:
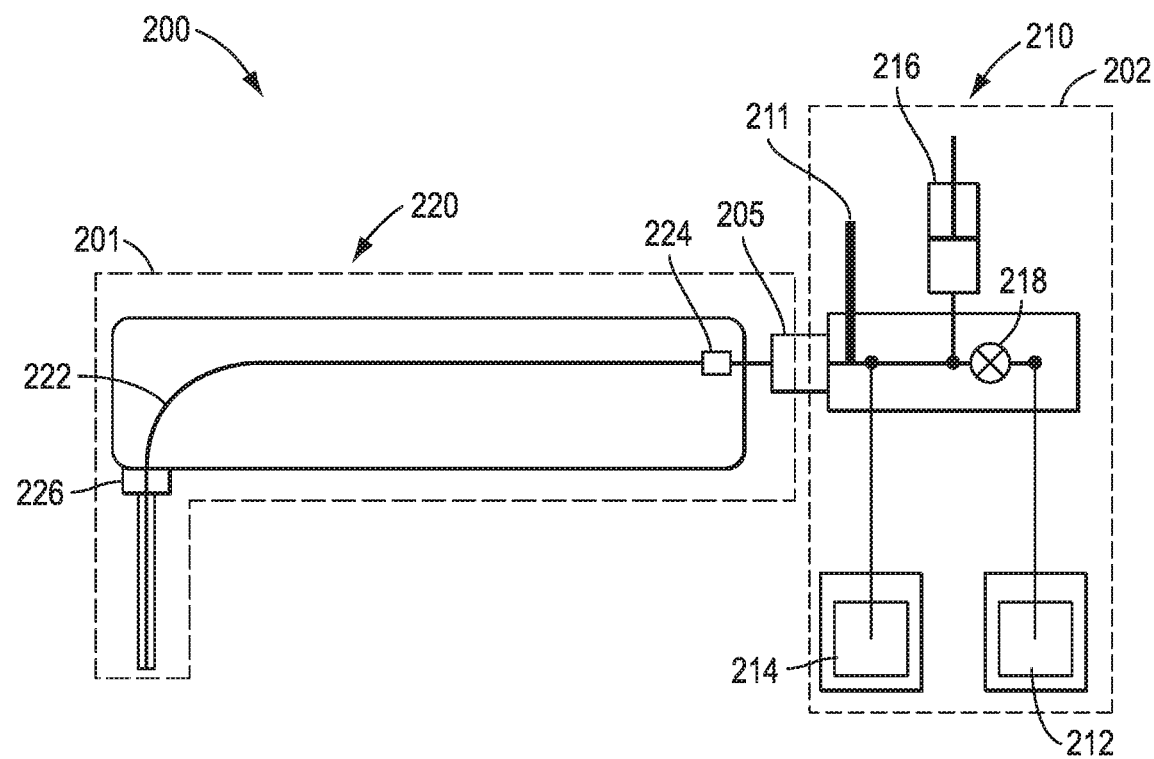
FIG. 2 is a block diagram that illustrates another capillary electrophoresis device.

FIG. 2 depicts an embodiment not uncommon to sequencers known in the art. Instrument 200 includes fluidics section 210 and capillary section 220. These sections are connected through coupling 205 and can be thermally controlled independently of each other as indicated by the dashed outlines 201 and 202. Capillary section 220 can include capillary 222, optics access 224 and cathode 226. Fluidics section 210 can further include buffer container 212, polymer container 214, pump 216, anode 211 and valve 218. In various embodiments capillary 222 can be an array of capillaries. While instrument 200 can be an improvement over the instrument depicted in FIG. 1, fluidics section 210 can still represent a complicated fluidics design, especially when an array of capillaries is coupled to the fluidics section.

Referring to FIG. 2, valve 218 can be used to connect the outlet of the capillary or capillary array, the polymer pump 216, buffer container 214 and the polymer container 212. In essence, valve 218 can be configured to fill capillary 222 with fresh polymer or place the cartridge ready for electrophoresis. In various embodiments the valve can be a custom made precision-machined Plexiglass component. In various embodiments the machined Plexiglass can be referred to as a "gel-block". Such a gel-block can be found, for example, in the Model 310 Sequencer from Life Technologies of South San Francisco, Calif. In various embodiments valve 218 can be constructed of two pieces. Each piece can be a custom made precision-machined Plexiglass component. Such a two piece embodiment can be found, for example, in the Model 3130 Sequencer from Life Technologies of South San Francisco, Calif.

In various embodiments a lower cost solution can be utilized to provide the functionality just described. The inventors have discovered that the fluidics functionality of both the Model 310 and Model 3130 Plexiglass components can largely be emulated by a medium pressure 4-way 2-position switching valve. In various embodiments the switching valve can be similar to switching valves used in liquid chromatography, and in particular in, for example, in bio-HPLC. Such a 4-way 2-position switching valve can be similar to valves manufactured by Upchurch Scientific and distributed by IDEX Health and Science of Oak Harbor, Wash.

In addition to providing a lower cost solution, a 4-way 2-position switching valve can also offer additional advantages. Advantages can include, but not be limited to, reduced polymer dead volume, improved availability from a variety of vendors with off the shelf components. The 4-way 2-position valves can also obviate the need for custom manufactured Plexiglass components as well as the non-standard pin-valves and high pressure ferrules associated with the Plexiglass components.

Additionally, there are also complexities surrounding anode 211 and cathode 226. Anode 211 and cathode 226 can be electrically connected to a high voltage source to provide a high potential across capillary 222. Since nucleic acids carry an electrical charge, this potential is necessary to migrate sample fragments through the capillary for separation and detection. Because the cathode is in capillary section 220 and the anode is in fluidics section 210, it can become challenging to isolate the high voltage from the rest of the instrument to prevent any electrical shock hazard to the user.

Figure 3:
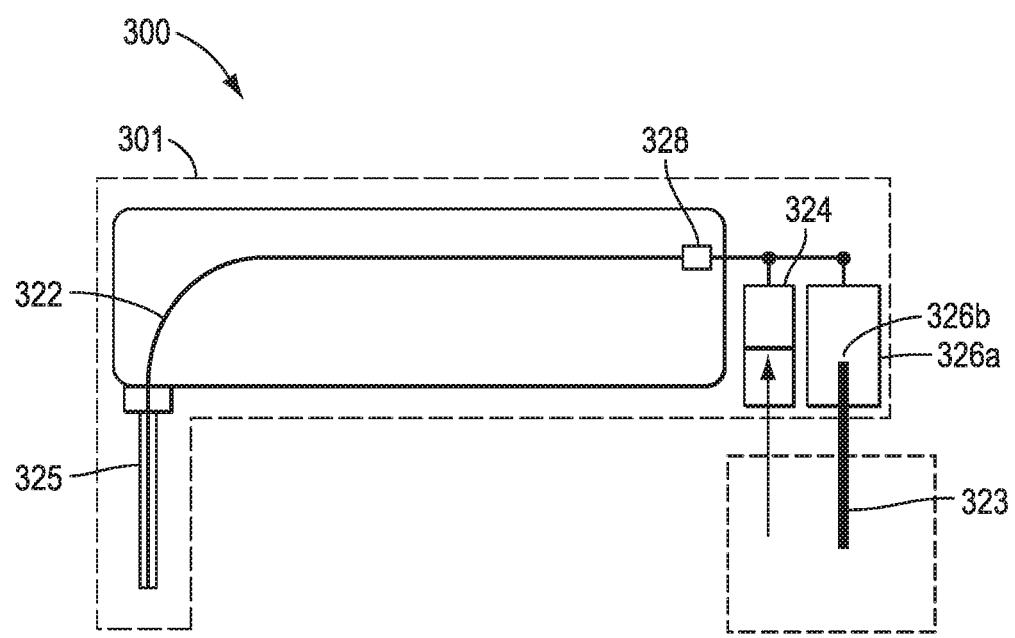
FIG. 3 is a block diagram that illustrates a sequencing apparatus in accordance with various embodiments.

The embodiment shown in FIG. 3 provides a distinct improvement over instrument 200 of FIG. 2. Cartridge assembly 300 can combine many of the elements of instrument 200 into an integrated unit. The integrated unit can include capillary 322, pump 324, container 326a, optical access 328, cathode 325 and access to anode 323. In various embodiments container 326a can contain separation matrix 326b. In various embodiments pump 324 can be a syringe pump. In yet another embodiment pump 324 can encompass electro-kinetics.

As shown capillary 322, pump 324, container 326a, optical access 328, cathode 325 and access to anode 323 can all be enclosed in a single temperature controlled zone 301 further simplifying the requirements of the instrument. In various embodiments separation matrix 326b can include a polymer and a buffer, thereby making the inclusion of a separate container for a buffer unnecessary and further simplifying the system. In various embodiments container 326a can provide enough separation matrix to conduct multiple sequencing runs. In various embodiments container 326a can provide enough separation matrix to conduct 100 sequencing runs.

In various embodiments cartridge 300 can be an easily removable cartridge that can enable a user to easily replace capillary 322, container 326a and pump 324 as a single unit. Cartridge 300 can further enable a user to streamline the sequencing workflow by eliminating the valve(s), fluid lines and multiple containers presented in FIG. 2.

Referring to FIG. 4A-4D an integrated valve assembly 400 is shown connected to capillary 460. Integrated valve assembly 400 can include manifold 410, polymer container 420, pinch point 430, pinch valve 440 and dispenser 450. In various embodiments integrated valve assembly 400 can be disposable.

Figure 4A:
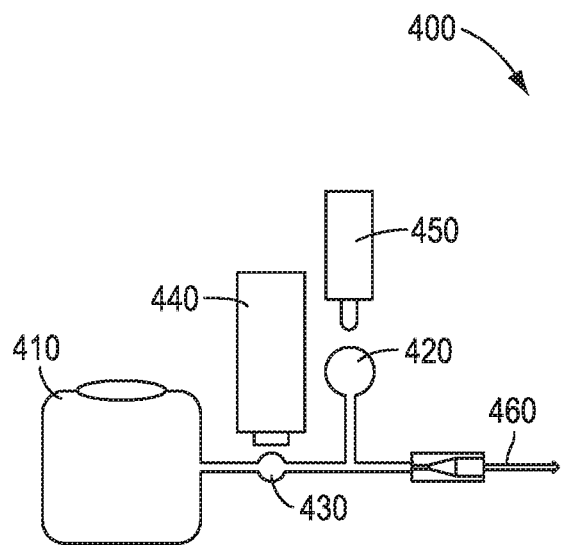
FIGS. 4A-4D are block diagrams that illustrate a disposable integrated valve assembly.

FIG. 4A depicts the conditions of pinch valve 440 and dispenser 450 suitable for performing capillary electrophoresis. For these conditions pinch valve 440 does not contact pinch point 430, and dispenser 450 is not in contact with polymer container 420. It is known in the art that prior to sequencing a biological sample a capillary needs to be pre-loaded with fresh polymer.

Figure 4B:
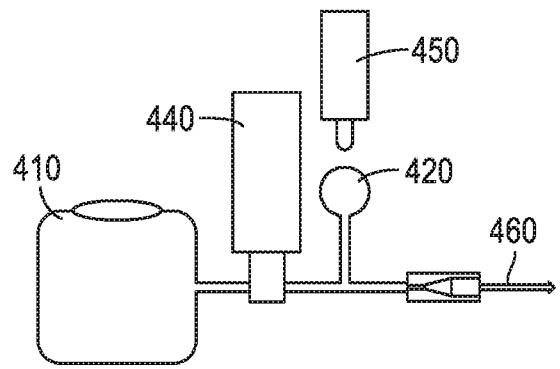
Figure 4C:
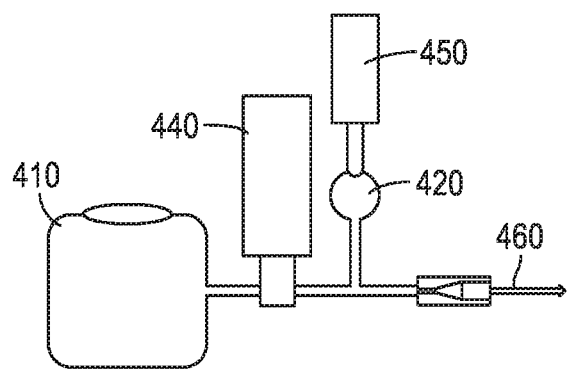
Figure 4D:
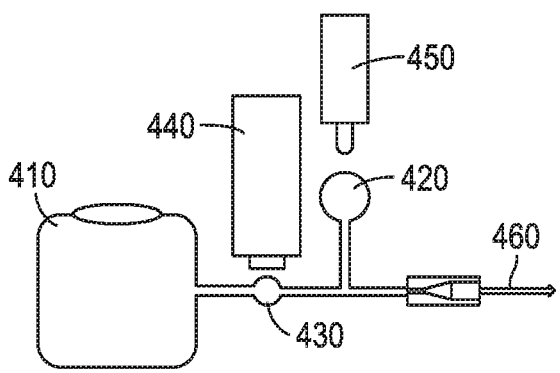

FIGS. 4B and 4C depict the loading process using integrated valve assembly 400. In FIG. 4B, pinch valve 440 is brought in contact with pinch point 430. Contacting pinch valve 440 with pinch point 430 serves to compress pinch point 430 and isolate manifold 410 from capillary 460. FIG. 4C depicts dispenser 450 in contact with polymer container 420 to push polymer from polymer container 420 into capillary 460. The cycle is completed in FIG. 4D where both pinch valve 440 and dispenser 450 are retracted to place the integrated valve assembly in suitable condition for electrophoresis.

In various embodiments manifold 410 can hold enough polymer to execute multiple sequencing runs. In some embodiments the manifold can be sufficient for running up to four capillary arrays ten times.

In various embodiments pinch valve 440 and dispenser 450 can be manually operated. The manual operation can be accomplished through the use of mechanical levers, handles, push buttons or any other suitable mechanism known in the art.

In various embodiments the operation of pinch valve 440 and dispenser 450 can be automated. Automating the action of pinch valve 440 and dispenser 450 can negate expensive instrument valves known in the art. The automation can be accomplished through the use of solenoids, motors, linear actuators or any other suitable mechanism known in the art.

Figure 5:
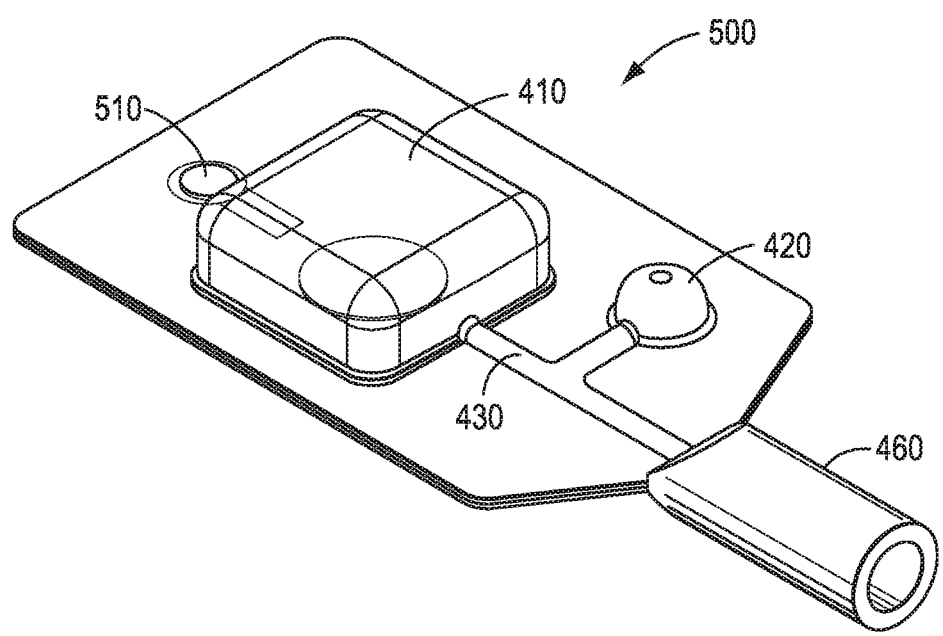
FIG. 5 is a representation of a blister pack in accordance with various embodiments

FIG. 5 a representation of blister pack 500. Blister pack 500 is a model of the integrated valve assembly depicted in FIG. 4. Wherever possible the same reference numbers are used to refer to the same or like parts. As shown, blister pack 500 can be a molded fluidics device that can direct fresh polymer to a capillary to recharge or pre-load capillary 460 prior to sequencing as discussed above. In various embodiments capillary 460 can be an array of capillaries.

As shown, blister pack 500 can include manifold 410, pinch point 430 and polymer container 420. In various embodiments manifold 410 can contain 1 ml of polymer. In various embodiments 1 ml of polymer can be sufficient to run multiple sequencing experiments. In various embodiments 1 ml of polymer can support up to four capillary arrays for ten runs.

Additionally blister pack 500 can further include printed electrode 510. Printed electrode 510 can be utilized as anode 323 as depicted in FIG. 3. Anode 323 can be utilized as one electrical terminal to apply high voltage to the capillary to promote migration of nucleic acid fragments through the capillary.

In various embodiments blister pack 500 can be loaded with polymer and shipped to the customer ready for use. In such an embodiment a user can attach blister pack 500 to capillary 460 and not be required to manually load polymer in the system. In various embodiments blister pack 500 can be a disposable element.

Figure 6:
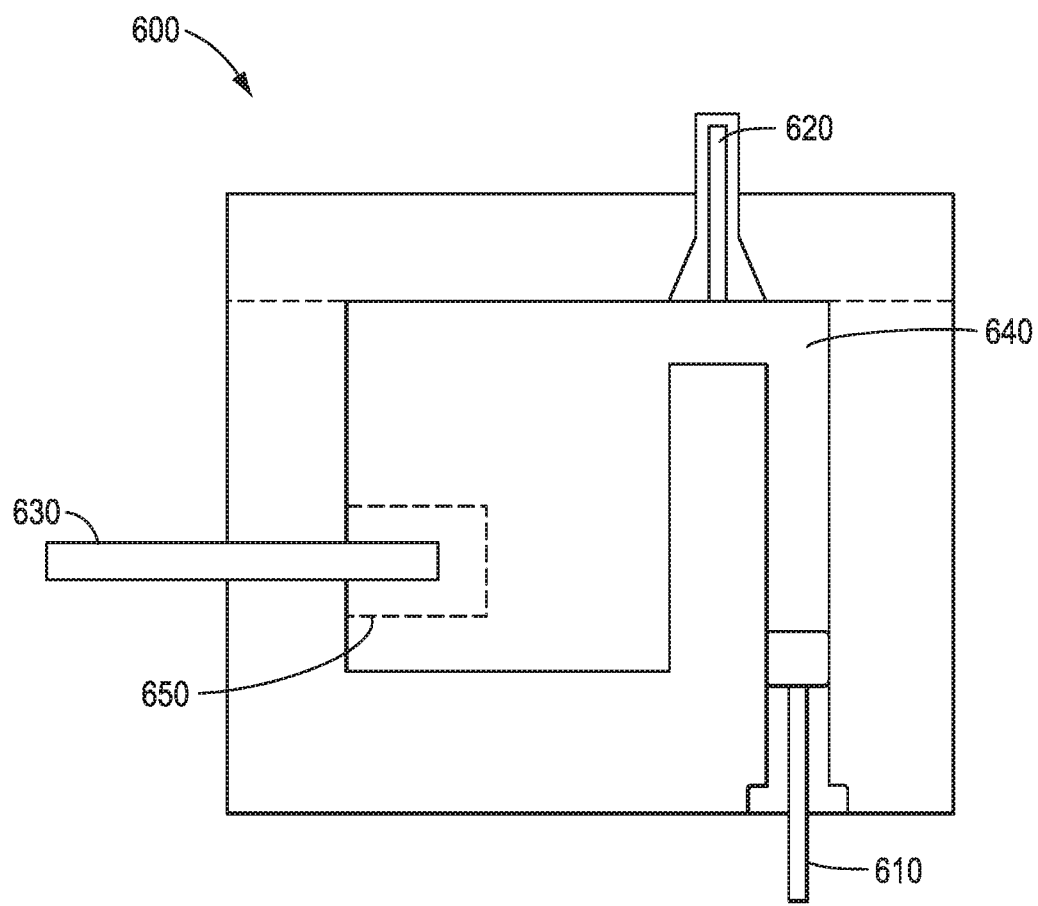
FIG. 6 is another embodiment of a polymer reservoir similar to elements depicted in FIG. 3.

Referring to FIG. 3, pump 324 is depicted as a separate element from 326a. FIG. 6 is another embodiment of a polymer reservoir similar to elements depicted in FIG. 3. In various embodiments piston actuator 610 can be located to act directly on polymer reservoir 640 to provide fresh polymer 640 to capillary 620. In various embodiments electrode 630 can be located in polymer 640. In various embodiments electrode 630 can be connected to a high voltage source (not shown). In various embodiments the high voltage source can generate the formation of gas and ions at the interface 650 between the electrode and the polymer. In various embodiments a gas permeable membrane or vent (not shown) can be included as part of the polymer reservoir to enable any formed gas or ions to escape.

Figure 7:
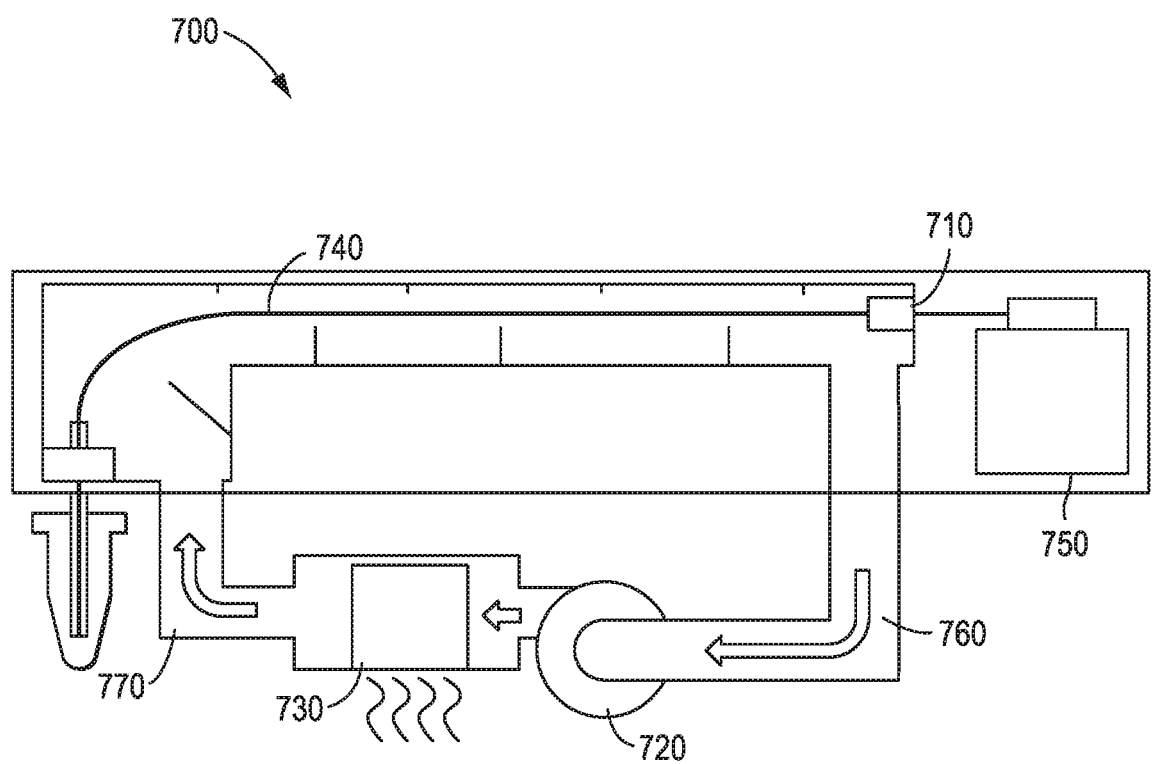
FIG. 7 is a block diagram of one embodiment that can be used to heat polymer in a capillary.

It is well known in the art that the separation of nucleic acid fragments during capillary electrophoresis can be improved when the polymer in the capillary is heated to a temperature above ambient. In various embodiments the temperature of the polymer can be between 40° C. and 60° C. FIG. 7 is a block diagram of one embodiment that can be used to heat polymer in a capillary. Heating diagram 700 can include a temperature control zone 710. Temperature control zone 710 can enclose capillary 740. Prior to sequencing, capillary 740 can be recharged or pre-loaded with fresh polymer delivered from polymer reservoir 750 as previously discussed.

Temperature control zone 710 can be connected to outlet duct 760 at one end of zone 710, and to inlet duct 770 at the opposing end. Outlet duct 760 can further be connected to the inlet of blower 720, while the outlet of blower 720 can be connected to the inlet of heat source 730. The outlet of heat source 730 can be connected to inlet duct 770 to form a complete air path with temperature control zone 710. In operation, heat source 730 can be controlled at a temperature between 40° C. and 60° C. as needed, and blower 720 can distribute the heated air through temperature control zone 710. Temperature control zone 710 can then be filled with the heated air to raise the temperature of capillary 740 to an optimum temperature.

Figure 8:
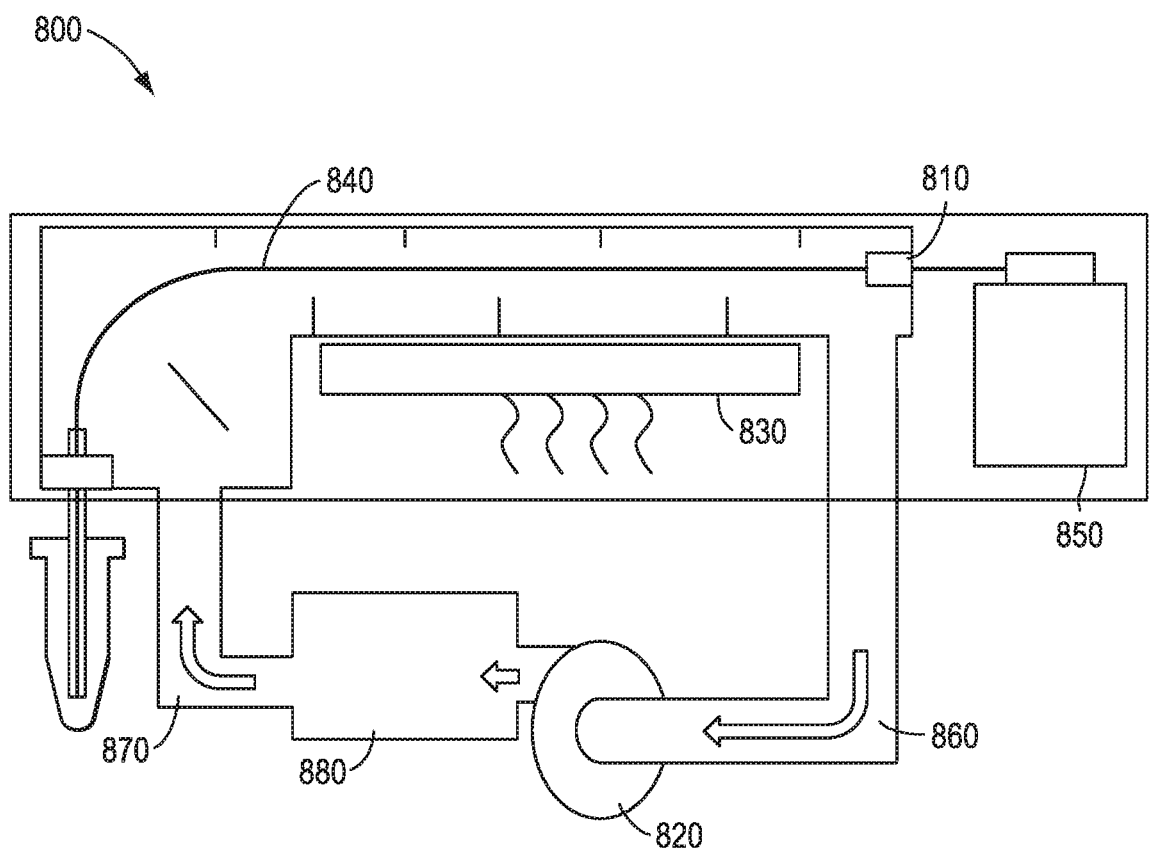
FIG. 8 is another embodiment illustrating an alternative for heating a capillary.

In another embodiment a capillary can be heated according the block diagram shown in FIG. 8. Heating diagram 800 can include temperature control zone 810 encompassing capillary 840. In this embodiment one end of temperature control zone can be connected to outlet duct 860 and the opposing end of temperature control zone can be connected to inlet duct 870. Outlet duct 860 can further be connected to the inlet of blower 820, while the outlet of blower 820 can be connected to the inlet of air chamber 880. The outlet of air chamber 880 can be connected to inlet duct 870 to form a complete air path with temperature control zone 810. In this embodiment heat source 830 is thermally coupled to the underside of temperature control zone 810. In operation, heat source 830 can be controlled at a temperature between 40° C. and 60° C. as needed, and blower 820 can distribute the heated air through temperature control zone 810 to provide a uniform heating of the polymer in capillary 840.

While the foregoing embodiments have been described in some detail for purposes of clarity and understanding, it will be clear to one skilled in the art from a reading of this disclosure that various changes in form and detail can be made without departing from the true scope of the embodiments disclosed herein. For example, all the techniques, apparatuses, systems and methods described above can be used in various combinations.

What is claimed is:

1. A biological sequencing system, comprising:
    one or more capillary tubes;
    an integrated valve assembly configured to dispense polymer to the one or more capillary tubes, wherein the integrated valve assembly forms a blister pack comprising a manifold, a pinch point and a polymer container, and wherein the blister pack is pre-loaded with polymer;
    an optical detection system;
    one or more heated chambers; and
    a processor capable of executing machine readable code to control the integrated valve assembly, the optical detection system and the one or more heated chambers.

2. The biological sequencing system of claim 1, wherein the integrated valve assembly further comprises:
    a pinch valve,
    a dispenser and
    a manifold.

3. The biological sequencing system of claim 2, wherein the pinch valve and dispenser are automatically controlled.

4. The biological sequencing system of claim 2, wherein the manifold is configured for containing a quantity of polymer sufficient for 10 runs.

5. The biological sequencing system of claim 1, wherein the blister pack further comprises a printed electrode configured to apply a predetermined voltage to the one or more capillary tubes.

6. The biological sequencing system of claim 1, wherein the one or more heated chambers are configured to form a complete air path with a temperature control zone, the temperature control zone enclosing the one or more capillary tubes.

7. The biological sequencing system of claim 6, further comprising a heat source configured to be heated to a predetermined temperature and a blower configured to distribute heated air through the one or more heated chambers to the temperature control zone for heating the polymer in the one or more capillary tubes.

* * * * *